March 5, 1935.  E. R. ROY  1,992,967
AUTOMATIC PACKING
Filed May 3, 1933
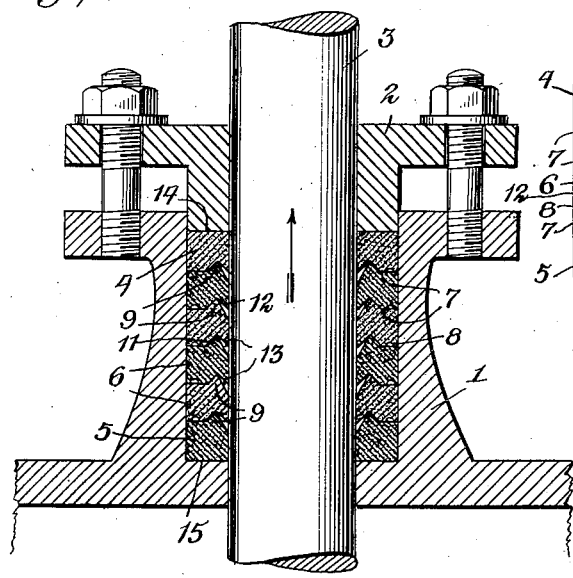
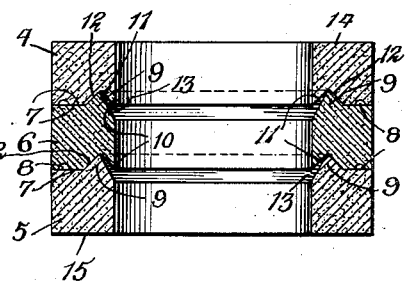
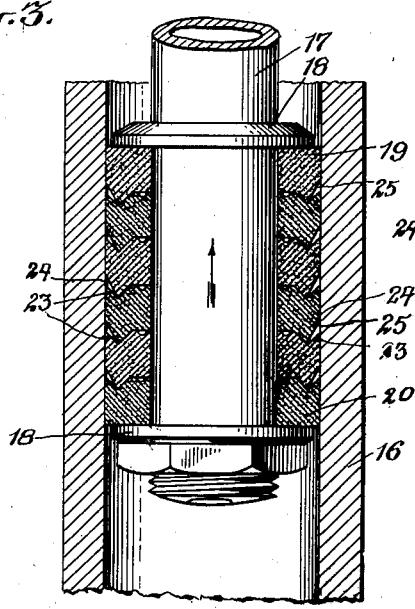
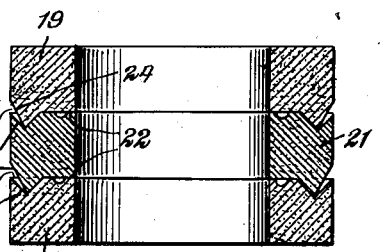
WITNESSES
INVENTOR
Ernest R. Roy
BY
ATTORNEYS Patented Mar. 5, 1935

1,992,967

UNITED STATES PATENT OFFICE 1,992,967

AUTOMATIC PACKING

Ernest R. Roy, Bound Brook, N. J.

Application May 3, 1933, Serial No. 669,252

1 Claim. (Cl. 288—1)

This invention relates to automatic packing, and I use this term "automatic packing" to define a packing which is caused to form a tight juncture with an adjacent part by reason of pressure between portions of the packing, as distinguished from packing which relies solely upon the compression of the packing to effect a proper action. My improved packing is adapted to all forms of stuffing boxes used on hydraulic, pneumatic and steam machinery.

An object of the invention is to provide packing which will operate with considerably reduced friction and will increase the efficiency throughout any pressure range, and will automatically adjust itself by reason of its construction for any leakage which may occur.

Another object of the invention is to provide a packing which enables the gland of the stuffing box to be tightened as desired without injuring the automatic action and efficiency of the packing and without causing undue friction, which is so often true with packings in general use.

Another object is to provide a packing which is permitted to expand and contract through varying degrees of temperature without altering the gland tension.

A further object is to provide an improved packing which will function properly even though the packing stands idle over the greater portion of the time, as static friction from automatic packing such as I have disclosed is very small while the static friction in compression forms of packing is very high and often dangerous; hence my improved packing is ideal from both practical and technical viewpoints.

A further object is to provide a packing of this character which is comparatively inexpensive to manufacture, and which is durable in construction and efficient in operation.

With these and other objects in view, the invention consists in certain novel features of construction and combinations and arrangements of parts, all of which will be more fully hereinafter described and pointed out in the claim.

In the accompanying drawing,—

Figure 1 is a view in longitudinal section showing my improved packing in operative position in a stuffing box;

Figure 2 is an enlarged view in longitudinal section showing end packing rings and a single intermediate packing ring between them, such as employed in the stuffing box illustrated in Figure 1;

Figure 3 is a view in longitudinal section illustrating a slightly modified form of my improved packing ring, which is in reality a reversal of the shape of rings shown in Figure 1 and employed as packing rings on a piston or plunger in a cylinder or casing such as utilized in oil wells;

Figure 4 is a view similar to Figure 2, illustrating several of the rings shown in Figure 3 on a somewhat enlarged scale.

Referring more particularly to Figures 1 and 2 of the drawing, 1 represents a stuffing box, 2 a gland, and 3 a rod or shaft adapted to reciprocate or turn in the stuffing box. In the stuffing box I employ end packing rings 4 and 5, and any desired number of intermediate packing rings 6. All of the intermediate packing rings 6 are precisely alike in shape and construction, while the end packing rings 4 and 5 are exactly reversed in shape or construction, as will now be explained.

All of the packing rings 6 have annular flat faces 7 which sustain the pressure on the packing, and in these flat faces annular cavities 8 are provided, which are used merely to take up any necessary expansion. The intermediate packing rings 6 are formed with upwardly projecting annular ridges 9 on their upper faces which are of general inverted V-shape in cross section, and the upper faces of said rings at their inner portions taper downwardly, as shown at 10. These intermediate rings 6 have in their lower faces annular grooves 11 which are of inverted V-shape in cross section, and the extremities of these packing rings at their inner portions are inclined, as shown at 12. I would call attention to the fact that the annular portions 10 and 11 of the adjacent packing rings are at an angle to each other so that annular cavities 13 are provided between the rings, and the inner portion of each ring constitutes an annular flexible lip which is caused to move by the pressure of a gas or other fluid in the cavities 13. In other words, each packing ring has an outer flat portion, which sustains pressure, each ring has an intermediate portion which is on one side shaped to form a ridge and at the other side forming a groove, and the ridge of one packing ring fits in the groove of the other so that this juncture constitutes in effect an annular fulcrum, leaving the inner annular portion of the ring beyond said fulcrum as a flexible lip, which is caused to move by fluid pressure as above explained.

One of the end rings, as for example ring 4, may have a straight or flat upper surface 14, and its under surface will be shaped like the under surface of each of the intermediate rings, and for this reason this under surface is given the same reference characters as those employed for the under surface of the intermediate rings. The lower or end packing 5 has a flat lower face 15, and its upper face corresponds with the upper faces of all of the intermediate rings, hence like reference characters are employed to indicate the shape of the upper surface of the lower or end packing ring 15.

By reason of this construction, when the rod 3 moves upwardly it will press the annular flexible lips at the inner portions of the rings upwardly and in close contact with the rod to prevent leakage in the direction of the gland. Any fluid which accumulates within the annular cavity 13 will assist in holding the lips of the packing rings against the rod, thus effectively preventing leakage, since this pressure within the cavities is proportionate to the pressure within the unit and the friction developed by the lip tension is also proportionate, and if (as is generally the case) the rod moves throughout most of its working stroke under high pressure and all of the return stroke under the lower pressure, there will be considerably reduced friction from the lip tension.

The packing, therefore, does not depend on the tightness of the gland to compress the packing to prevent leakage. In this way the excessive or unnecessary friction or wear is avoided, which increases the general efficiency of the unit in which the packing is employed. The packing also gives longer and uninterrupted service, lessens cost of maintenance and avoids the renewal of worn or pitted shaft and plunger. The packing may be used for high pressure, and the material of this packing may be made from asbestos, cotton duck and other forms of similar fabricated cloth depending on the form of service employed; leather may be used very successfully. The rings are molded to their proper shape and may be made in long spirals and cut to suitable lengths, as desired.

In the modification illustrated in Figures 3 and 4 of the drawing, I illustrate my improved packing employed in connection with a piston or plunger in an oil well casing. In these figures of the drawing 16 represents a casing, 17 a piston rod and 18 rings on the rod 17 between which the improved packing rings are employed. These packing rings shown in Figures 3 and 4 of the drawing function in precisely the same manner as the packing rings illustrated in Figures 1 and 2 of the drawing, except that they are so shaped that the annular cavities and annular flexible lips are at the outer portions or circumferences of the rings and not at the inner portions of the rings, as in this instance it is desirable to support the rings on the plunger and provide a proper packing between the plunger and the inner surface of the casing 16. In this form of packing 19 and 20 illustrate end rings, and 21 intermediate rings. All of these rings have annular flat faces 22 at their inner portions to sustain the compression or pressure, and adjacent their outer portions are formed with inverted V-shaped recesses 23 and inverted V-shaped ridges 24 smaller in cross sectional size than the recesses 23 and projecting therein respectively, and the ridges 24 constituting annular fulcrums and providing annular cavities 25 between them and the outer portions or lips of the rings, leaving the outer extremities of the rings free and flexible so that they are moved by fluid pressure as above explained.

The operation of the rings shown in Figures 3 and 4 are precisely the same as that described in Figures 1 and 2 of the drawing, with the exception, of course, that the rings are exactly reversed in their construction and shape.

While I have illustrated what I believe to be the preferred embodiments of my invention, it is obvious that this form of packing may be utilized in connection with other forms of packing boxes, plunger or mounting of any sort where two parts are provided, one movable relative to the other; hence I do not wish to be limited to the precise details set forth but consider myself at liberty to make such changes and alterations as fairly fall within the spirit and scope of the claim.

I claim:

A packing composed of at least two rings, both having flat parallel surfaces at their non-service edges to sustain pressure and an annular V-shaped groove in one face of each ring adjacent its service edge and an annular V-shaped ridge on the other face of each ring projecting beyond the flat surface and positioned in the annular groove of the adjacent ring, said ridge and groove providing a fulcrum for the annular service edge portion of the ring, there being an annular space provided between the wall of the ridge on one ring and the wall of the groove in the other ring.

ERNEST R. ROY.